US008079840B2

(12) United States Patent
Foo et al.

(10) Patent No.: US 8,079,840 B2
(45) Date of Patent: Dec. 20, 2011

(54) METHOD AND APPARATUS FOR FORMING A METAL-CEMENTITIOUS CORE-METAL COMPOSITE SANDWICH STRUCTURE

(75) Inventors: Kok Seng Foo, Singapore (SG); Matthew Chin Kau Quah, Singapore (SG); Edgar Sammy Choon Teck Lim, Singapore (SG)

(73) Assignee: Keppel Offshore & Marine Technology Centre Pte Ltd, Singapore (SG)

(*) Notice: Subject to any disclaimer, the term of this patent is extended or adjusted under 35 U.S.C. 154(b) by 288 days.

(21) Appl. No.: 12/436,430

(22) Filed: May 6, 2009

(65) Prior Publication Data

US 2009/0278026 A1 Nov. 12, 2009

(30) Foreign Application Priority Data

May 6, 2008 (SG) ................................ 200803602-2

(51) Int. Cl.
*B23B 19/00* (2006.01)

(52) U.S. Cl. ........................... 425/110; 425/588; 249/83

(58) Field of Classification Search .................... 249/83; 425/110, 127, 572, 588; 141/346, 383; 411/396, 411/402, 404, 424, 82.1, 82, 930; 52/742.13; 156/91, 291, 295; 239/548, 568
See application file for complete search history.

(56) References Cited

U.S. PATENT DOCUMENTS

| | | | | |
|---|---|---|---|---|
| 4,509,884 | A * | 4/1985 | Trout et al. | 405/269 |
| 4,878,329 | A | 11/1989 | Pawski | |
| 5,778,813 | A | 7/1998 | Kennedy | |
| 6,036,397 | A * | 3/2000 | Goto | 403/268 |
| 2003/0035696 | A1* | 2/2003 | Ducker et al. | 411/82.1 |
| 2007/0172641 | A1 | 7/2007 | Serwin et al. | |

OTHER PUBLICATIONS

N. K. Subedi, Ph.D., "Double Skin Steel/Concrete Composite Beam Elements: Experimental Testing," Nov. 4, 2003, The Structural Engineer, pp. 30-35.

* cited by examiner

*Primary Examiner* — Yogendra Gupta
*Assistant Examiner* — Ninh Le
(74) *Attorney, Agent, or Firm* — Venable LLP; Michael A. Sartori; Leigh D. Thelen

(57) ABSTRACT

A method for forming a composite structure. The method comprises providing a first injection port on a first metal plate, spacing the first metal plate from a second metal plate such that the first metal plate and the second metal plate define a core cavity therebetween, casting a core of cementitious material into the core cavity, and injecting a bonding agent through the first injection port into an interfacial space between the core and the first metal plate.

4 Claims, 6 Drawing Sheets

METHOD AND APPARATUS FOR FORMING A METAL-CEMENTITIOUS CORE-METAL COMPOSITE SANDWICH STRUCTURE

TECHNICAL FIELD

This invention relates generally to a method and apparatus for forming a composite structure, and relates more particularly, though not exclusively, to a method and apparatus for forming a metal-cementitious core-metal sandwich panel, which may be aligned vertically, horizontally, inclined or curved, for carrying or resisting applied loads.

BACKGROUND

A composite metal-cementitious core-metal sandwich typically comprises two metal sandwiching plates with a core of a cementitious material sandwiched therebetween. This is a more effective use of metal as thinner metal plates may be used to achieve a similar load carrying capacity, in particular bending capacity, compared to a metal panel of equivalent metal thickness but that does not have a sandwiched core therein. This is because the sandwiched core can act integrally with the sandwiching plates to increase the leverage between the tension and compression areas of the metal plate in bending, while the sandwiching plates confine the cementitious core in compression, thereby increasing its load carrying capacity. This metal-cementitious core-metal sandwich panel typically has structural applications in the construction of structural decks and hulls of marine vessels and as ice belts in offshore structures.

To form the sandwich, the cementitious core is commonly pre-cast as a panel using dismantleable and removable casting formwork, followed by bonding a metal plate to each face of the resulting cementitious panel after removal of the formwork. Alternatively, the metal plates may be assembled to define a core cavity therebetween, followed by casting the cementitious material into the cavity, with the metal plates acting as formwork for encasing the cementitious material during casting.

Such sandwich panels, although ideal for use in a wide range of structural applications, are vulnerable to interfacial slip between the metal and cementitious core and local buckling of the metal plate under loading because of the naturally poor bonding between cementitious core and metal plates. To overcome this, interfacial bonding agents such as chemical adhesive have been introduced to bond the metal plates to the cementitious core. However, the traditional production process for this is time consuming because the cementitious core has first to be pre-cast in a separate formwork, and it involves costly processes to achieve a void-free and uniform adhesive interfacial layer.

Alternative sandwich structures have been proposed that introduce overlapping metal shear studs or connectors provided on the metal plates and projecting into the core cavity prior to casting the cementitious material into the cavity around the metal studs or connectors. Another version involves connectors welded at both ends to the sandwiching metal plates, and casting cementitious material into the core cavity. Although this can halt interfacial slip and minimize shear failure, buckling of the metal plates away from the cementitious core at locations remote from the metal studs or connectors can still occur because of a lack of a continuous bond between the metal plates and the cementitious core.

SUMMARY

The invention aims to provide a new and useful method and apparatus for forming a composite structure. The composite structure preferably comprises a core sandwiched between two outer layers. The core may be of a cementitious material such as concrete and the two outer layers may be metal plates, such as steel.

In general terms, the present invention proposes that a bonding agent may be injected into the interfacial space between the core and at least one of the outer layers through an injection port that is provided on that outer layer. The injection port may be provided through a hole in that outer layer or the injection port may be provided through a hole in the opposing outer layer.

The injection port preferably comprises a hollow stem connected to a diffusion head. The hollow stem and the diffusion head are preferably in fluid communication to allow a bonding agent such as epoxy to be delivered through one of the outer layers (and through the core if necessary) into the interfacial space between the core and the same or other opposing outer layers.

Preferably, injection ports are provided to deliver the bonding agent into the interfacial spaces between the core and each of the two outer layers. The injection ports may be provided through both outer layers. Alternatively, the injection ports may be provided through only one of the outer layers, wherein some of the injection ports are extended through the core to the interfacial space between the core and the opposing outer layer, where desired.

The injection port may further serve to space the two outer layers apart for casting the core therebetween, prior to injecting the bonding agent.

Injecting the bonding agent into the composite sandwich through the injection ports strengthens the composite action of the sandwich panel as the bonding agent fastens the outer layers onto the core integrally, preventing delamination of the bonded outer layers from the core when the panel is being loaded during use.

Injecting the bonding agent after the composite sandwich has been formed also eliminates the need for separate formwork to pre-cast the cementitious core prior to bonding the outer layers onto the pre-cast core. By the present invention, cementitious material can be directly cast into the core cavity defined by the two metal plates prior to injection of the bonding agent.

The present invention is also compatible for use with other strengthening features such as the overlapping metal studs or connectors, or through welded studs provided on or between the outer metal layers.

A first specific expression of the invention is a method for forming a composite structure. The method comprises providing a first injection port on a first metal plate; spacing a second metal plate from the first metal plate such that the first metal plate and the second metal plate define a core cavity therebetween; casting a core of cementitious material into the core cavity; and injecting a bonding agent through the first injection port into an interfacial space between the core and the first metal plate.

A second specific expression of the invention is an injection port for injecting a bonding agent into a composite structure. The composite structure comprises a core sandwiched between two outer layers. The injection port comprises a hollow stem for delivering the bonding agent through a hole in one of the metal plates into an interfacial space between the core and one of the two outer layers.

A third specific expression of the invention is a composite structure comprising a cementitious core sandwiched between two outer metal layers; a layer of a bonding agent between the cementitious core and at least one of the outer metal layers; and an injection port at the layer of the bonding agent for delivery of the bonding agent into an interfacial space between the cementitious core and at least one of the outer metal layers after casting of the cementitious core in between the two outer metal layers.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings.

DETAILED DESCRIPTION OF EXEMPLARY EMBODIMENTS

A method and apparatus for forming a composite structure will now be described with reference to the accompanying figures.

Figure 1A:
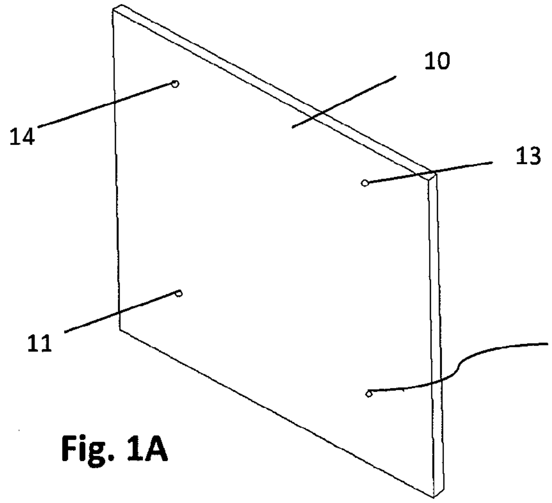
FIG. 1A is a schematic perspective view of a first metal plate provided with holes.
Figure 1B:
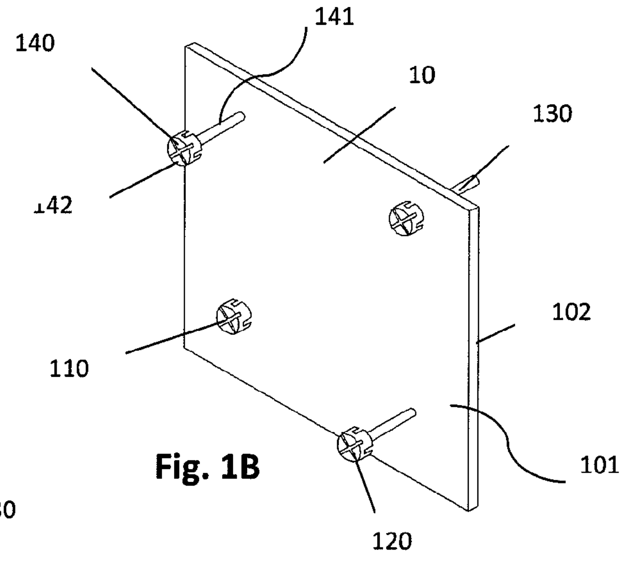
FIG. 1B is a schematic perspective view of the first metal plate of FIG. 1A with an injection port inserted through each hole.

As shown in FIG. 1A, a plurality of identical through holes 11, 12, 13, 14 are initially provided in a first metal plate 10 at appropriate spacing along the entire length and breath of the first metal plate 10. Preferably, the holes are provided at intervals of about 300 mm to 600 mm in the first metal plate 10. A plurality of identical injection ports 110, 120, 130, 140 are then inserted through the holes 11, 12, 13, 14 respectively, as shown in FIG. 1B, and adjustably fastened to the first metal plate 10. Each injection port 140 has a hollow stem 141 and a diffusion head 142. The holes 11, 12, 13, 14 may be threaded or simple holes, depending on the desired means for adjustably fastening the injection ports.

Figure 1C:
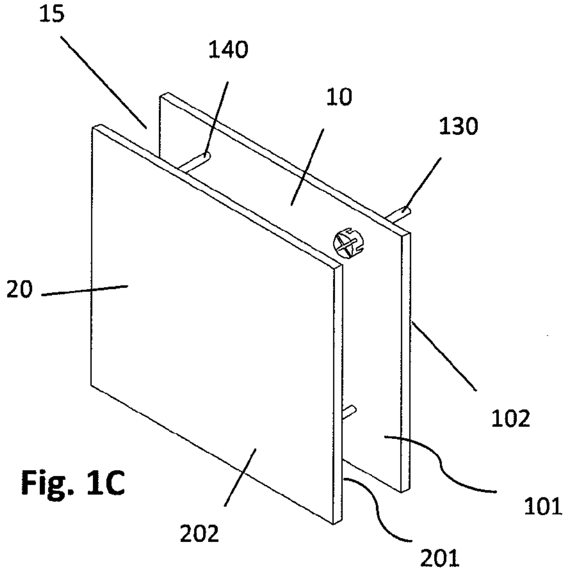
FIG. 1C is a schematic perspective view of the first metal plate of FIG. 1B and a second metal plate defining a core cavity therebetween.

The injection ports 110, 120, 130, 140 are inserted through the first metal plate 10 such that when a second metal plate 20 is positioned as close as possible to the inside surface 101 of the first metal plate 10, the diffusion heads of injection ports 110, 130 are provided on the inside surface 101 of the first metal plate 10 while the diffusion heads of injection ports 120, 140 are provided on the inside surface 201 of the second metal plate 20, as shown in FIG. 1C. This may be achieved by having the injection ports 120, 140 project from the inside surface 101 of the first metal plate 10 into the core cavity 15 towards the second metal plate 20 so that the injection ports 120, 140 serve to space the second metal plate 20 away from the first metal plate 10. The first metal plate 10 and the second metal plate 20 as shown in FIG. 1C thus define a core cavity 15 therebetween into which the cementitious material is to be cast. The hollow stem of each of the injection ports 120, 140 should be of sufficient length to define a desired width of the core cavity 15.

Figure 2:
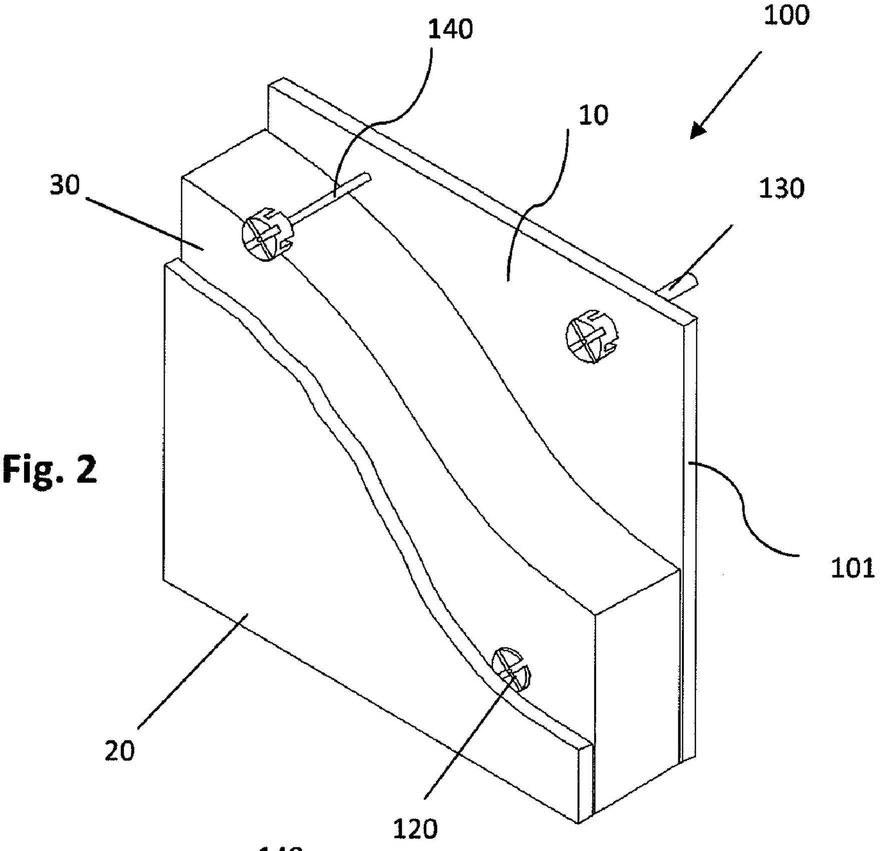
FIG. 2 is a schematic sectional perspective view of the first and second metal plates of FIG. 1C with cementitious material cast into the core cavity.

After the injection ports 110, 120, 130, 140 have been installed on the first metal plate 10 and the two metal plates 10, 20 have been assembled, cementitious material 30 such as concrete is cast into the core cavity 15 between the two metal plates 10, 20, as shown in FIG. 2, forming a composite metal-cementitious core-metal sandwich 100.

When the cementitious core 30 has attained sufficient strength, a bonding agent such as epoxy is injected through the injection ports 110, 130 into an interfacial space between the cementitious core 30 and the inside surface 101 of the first metal plate 10 to create a bond between the cementitious core 30 and the first metal plate 10. A bonding agent is also injected through the injection ports 120, 140 into an interfacial space between the cementitious core 30 and the inside surface 201 of the second metal plate 20 to create a bond between the cementitious core 30 and the second metal plate 20. The interfacial spaces arise as a result of shrinkage of the core 30 during casting of the cementitious material.

The sandwich 100 thus includes a first bonding layer 210 between the first metal plate 10 and the cementitious core 30, and a second bonding layer 220 between the second metal plate 20 and the cementitious core 30. To improve the interfacial bond between the metal plates 10, 20 and the bonding layers 210, 220 respectively, the inside surfaces 101, 201 of the metal plates 10, 20 may be roughened by sandblasting prior to assembly of the plates 10, 20. No other surface preparation is necessary prior to injection of the bonding agent besides keeping the inside surfaces 101, 201 of the metal plates 10, 20 free of any oil or debonding agents that may adversely affect the adhesion between the bonding agent with the cementitious core 30 and the metal plates 10, 20.

Preferably, where the sandwich 100 is oriented vertically or at an inclination or curve, for each bonding layer (e.g. 220), the bonding agent is first injected through the lowest injection port 120 until the bonding agent leaks through the next higher injection port 140. The lowest injection port 120 is then sealed and the bonding agent is injected through the next higher injection port 140. For a large panel of a composite sandwich 100 provided with many injection ports, the injection process is continued in the same way for successively higher injection ports until the interfacial space between the cementitious core and the metal plate has been completely injected with bonding agent. Where the sandwich 100 is laid substantially horizontally, injection of the bonding agent is preferably performed sequentially through successive injection ports in a similar manner.

Figure 3:
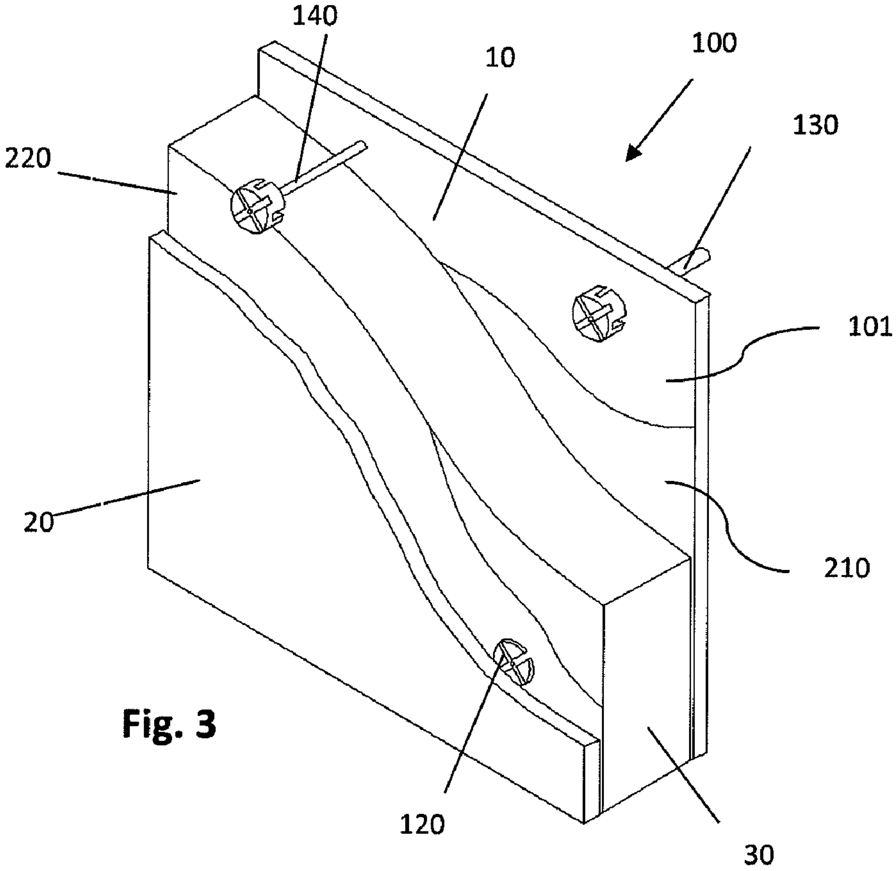
FIG. 3 is a schematic sectional perspective view of the metal-cementitious core-metal sandwich of FIG. 2 having bonding agent injected into an interfacial space between the cementitious core and the first metal plate and an interfacial space between the cementitious core and the second metal plate.
Figure 4A:
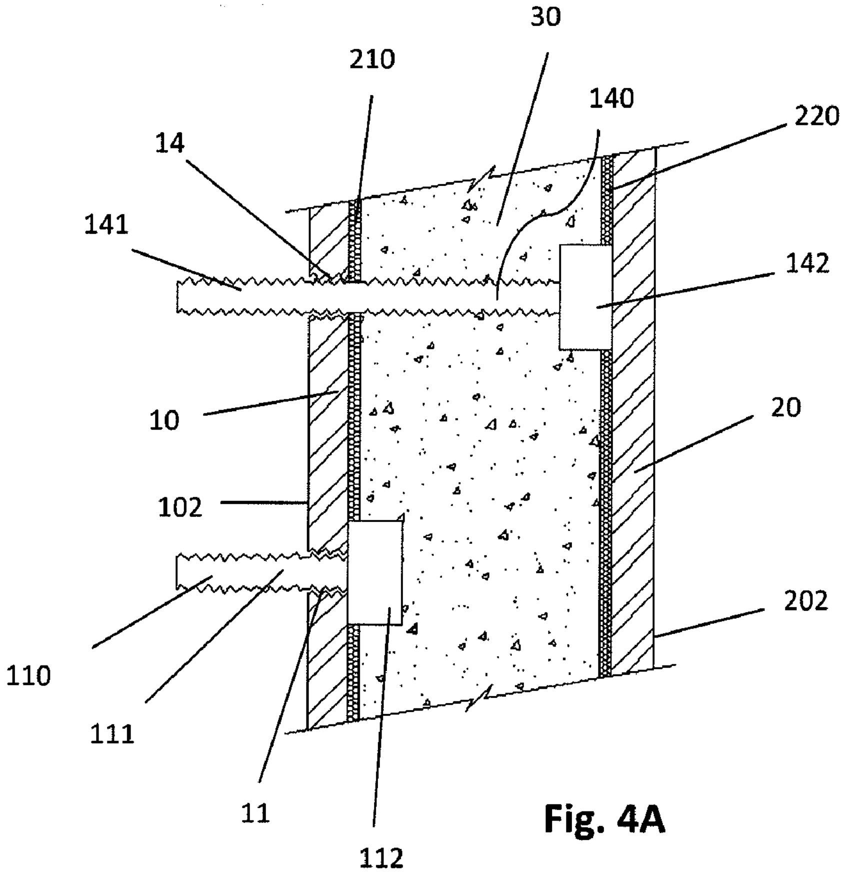
FIG. 4A is a schematic cross-sectional side view of the metal-cementitious core-metal sandwich of FIG. 3.
Figure 4B:
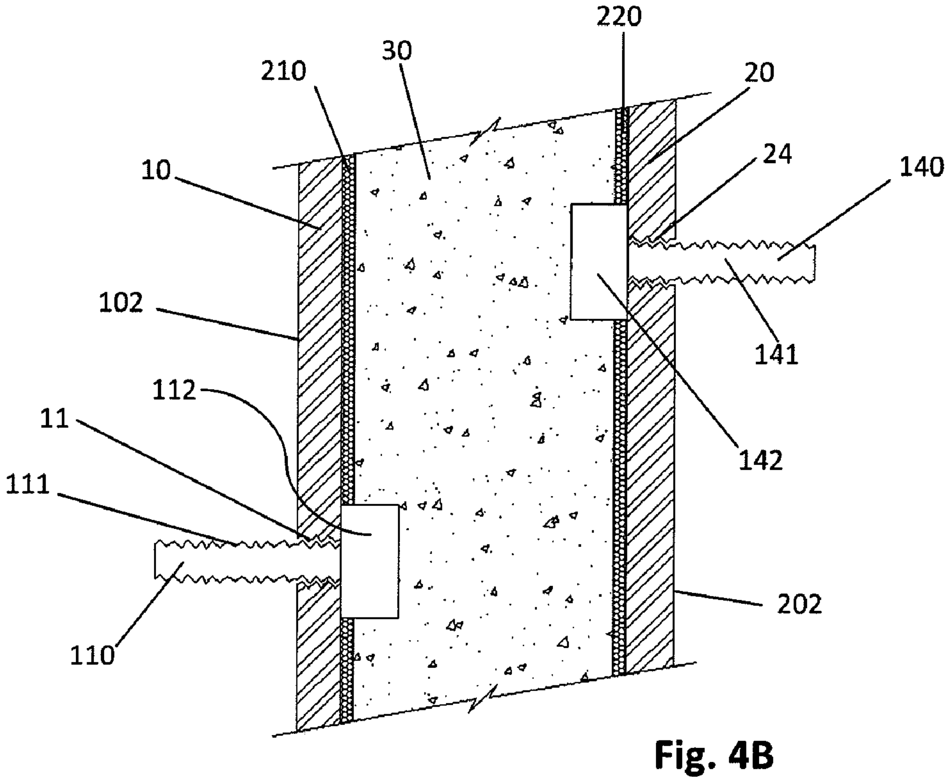
FIG. 4B is a schematic cross-sectional side view of an alternative embodiment of the metal-cementitious core-metal sandwich of FIG. 3.
Figure 4C:
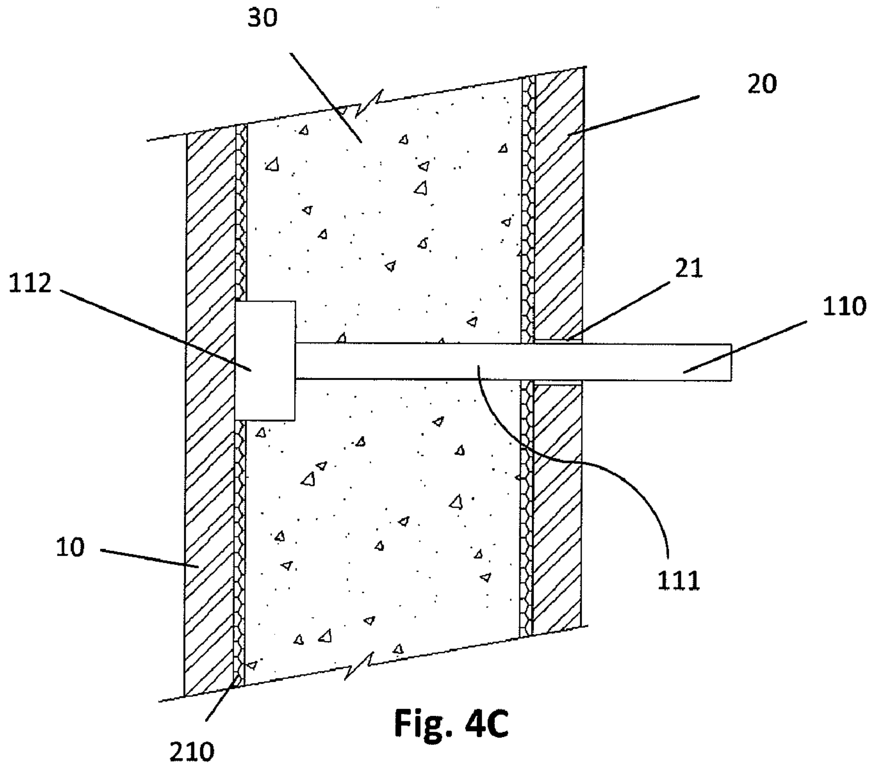
FIG. 4C is a schematic cross-sectional side view of another alternative embodiment of a metal-cementitious core-metal sandwich.
Figure 4D:
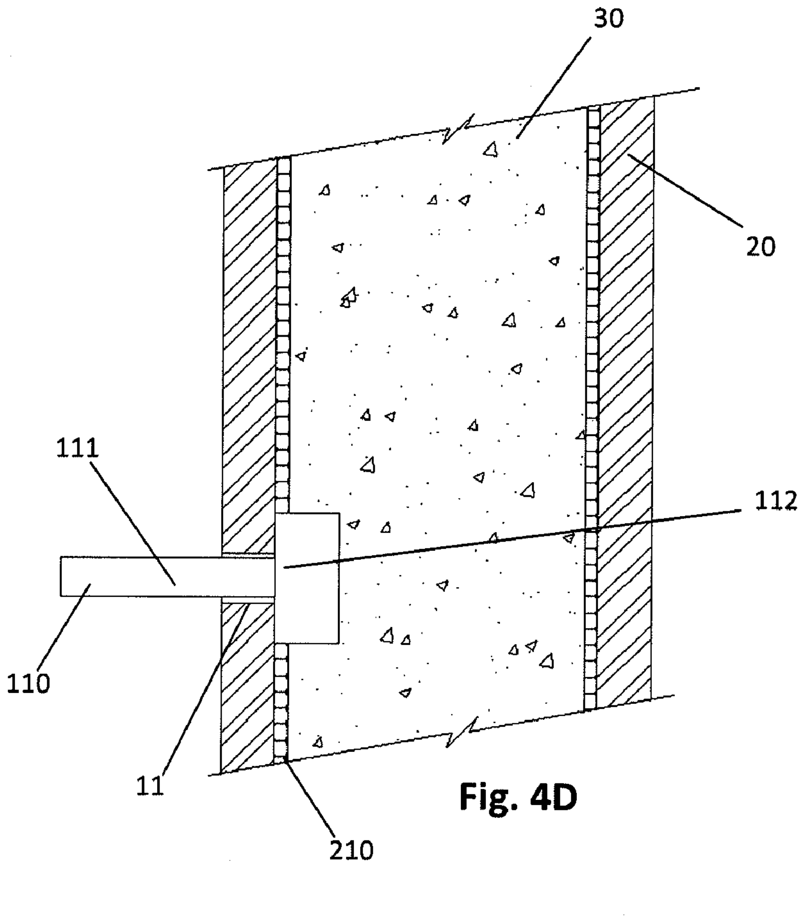
FIG. 4D is a schematic cross-sectional side view of an alternative embodiment of the metal-cementitious core-metal sandwich of FIG. 4C.

FIG. 4A shows a cross-sectional side view of the sandwich of FIG. 3. As can be seen, both the injection ports 110, 140 are provided through holes 11, 14 respectively in the first metal plate 10, as described earlier. In an alternative embodiment as shown in FIG. 4B, the second injection port 140 may be provided through a hole 24 in the second metal plate 20 instead. In both embodiments, the diffusion head 112 of the first injection port 110 is provided on the first metal plate 10 while the diffusion head 142 of the second injection port 140 is provided on the second metal plate 20.

Although the method outlined above with reference to FIGS. 1A to 4B describe the formation of a composite metal-cementitious core-metal sandwich having two bonding layers 210, 220, alternative embodiments of the composite sandwich may be formed that comprise only one bonding layer 210. As shown in FIGS. 4C and 4D, in the formation of these embodiments, the diffusion head 112 of the injection port 110 is only provided on the first metal plate 10. The injection port 110 may be provided through a hole 21 in the second metal plate 20 (FIG. 4C) or through a hole 11 in the first metal plate 10 (FIG. 4D).

Figure 5A:
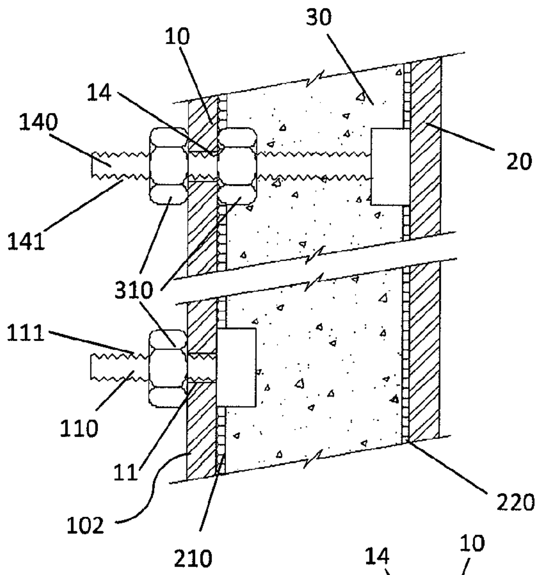
FIG. 5A is a schematic cross-sectional view of the metal-cementitious core-metal sandwich of FIG. 3 with a first embodiment of a provision for length adjustment of the injector port.
Figure 5B:
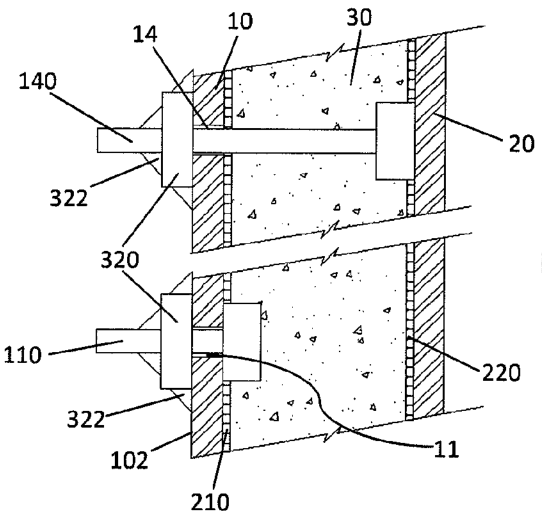
FIG. 5B is a schematic cross-sectional view of the metal-cementitious core-metal sandwich of FIG. 3 with reinforcement around the holes through which the injection ports are provided.
Figure 5C:
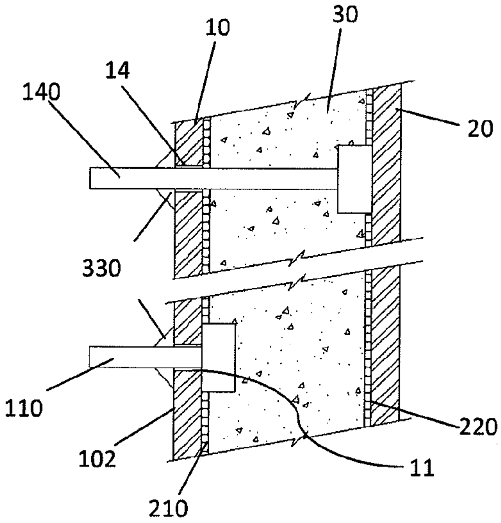
FIG. 5C is a schematic cross-sectional view of the metal-cementitious core-metal sandwich of FIG. 3 with a second embodiment of a provision for length adjustment of the injector port.

In all the above embodiments, the spacing of the second metal plate 20 from the first metal plate 10 may be controlled by adjusting the length of the injection ports that project from a metal plate into the core cavity to define the width of the core cavity 15. To adjust said length, FIG. 4A shows the provision of threaded holes 11, 14 in the metal plate 10 into which threaded stems 111, 141 of the injection ports 110, 140 may be adjustably screwed. In FIG. 5A, the injection ports 110, 140 are provided with threaded stems 111, 141 that pass through simple holes 11, 14 in the metal plate 10 and are adjustably fastened to the metal plate 10 using bolts 310. Alternatively, as shown in FIG. 5C, the injection ports 110, 140 may simply be welded 330 to the metal plate 10 after adjusting the separation of the metal plates 10, 20 during assembly. The holes 11, 14 in the metal plate 10 may further be reinforced by welding 322 stiffening rings 320 around the holes 11, 14, as shown in FIG. 5B.

Figure 6A:
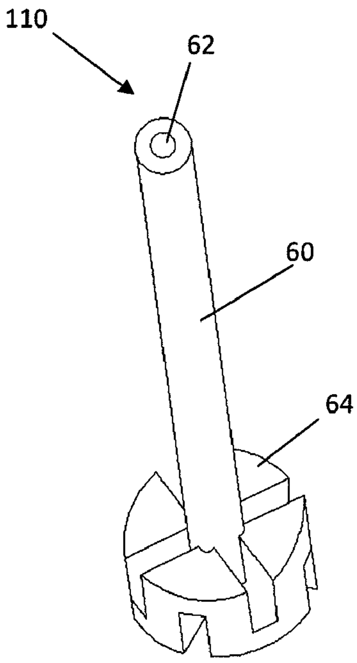
FIG. 6A is a schematic top perspective view of an injection port.
Figure 6B:
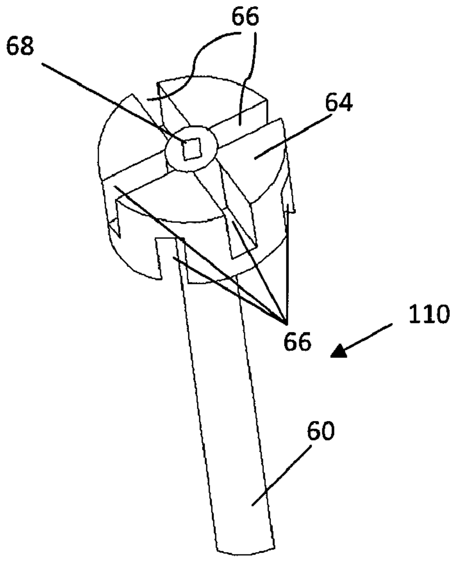
FIG. 6B is a schematic bottom perspective view of the injection port of FIG. 6A.
Figure 6C:
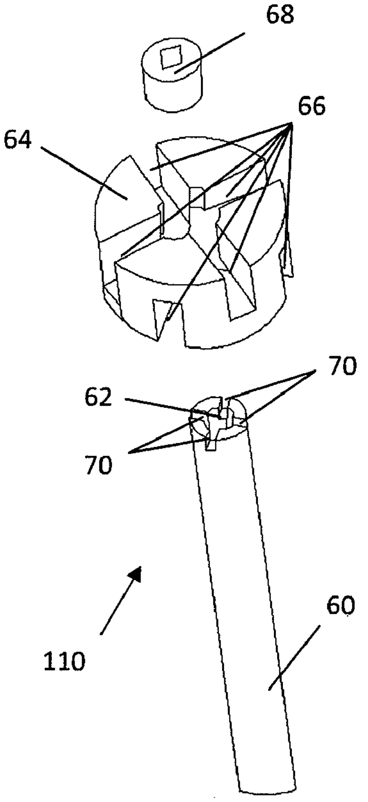
FIG. 6C is a schematic exploded assembly view of the injection port of FIG. 6B.

As shown in FIGS. 6A-C, each injection port 110 preferably comprises a hollow stem 60 having a through hole 62. The injection port 110 preferably also comprises a diffusion head 64 connected to the hollow stem 60. The diffusion head 64 comprises a plurality of outlets 66 that are in fluid communication with the through hole 62 of the stem 60. The hollow stem 60 allows the bonding agent to be delivered through a hole in one of the metal plates. The diffusion head 64 allows the bonding agent to be delivered into the interfacial spaces between the cementitious core and the metal plates. Preferably, the outlets 66 are radially spaced apart for even spreading of the bonding agent. More preferably, the diffusion head 64 is configured to allow delivery of the bonding agent into the interfacial spaces irrespective of which of the metal plates the injection port is provided on or through. Even more preferably, the diffusion head 64 is configured to restrict reverse flow of the cementitious material when freshly cast, to prevent the cementitious material from re-entering and blocking the outlets 66.

The hollow stem 60 and the diffusion head 64 may be integral with each other. Alternatively, the diffusion head 64 may include a central hole for securing the hollow stem 60 therein using a bolt 68. The hollow stem 60 may comprise channels 70 at one end of the stem that are in fluid communication with the through hole 62. The channels 70 are also in fluid communication with the plurality of outlets 66 on the diffusion head 64 when the hollow stem 60 is secured to the diffusion head 64. Depending on the provisions desired for adjusting the length of the injection ports that define the width of the core cavity between the two metal plates, as described above, the hollow stem 60 may or may not be externally threaded.

Whilst there has been described in the foregoing description exemplary embodiments of the present invention, it will be understood by those skilled in the technology concerned that many variations in details of design, construction and/or operation may be made without departing from the present invention. For example, although up to four injection ports have been described in the exemplary embodiment, numerous injection ports may be provided as the size of the composite structure to be formed may require. Also, it may be desired that all the injection ports may be provided through holes in one metal plate only. Alternatively, the injection ports provided for one of the metal plates may be provided only through holes in that metal plate itself, or they may be provided only through holes in the other metal plate. Various other combinations of provision of the injection ports on both metal plates through holes in the metal plates can be envisaged. The above method and apparatus for forming the composite sandwich may also be used in conjunction with other features such as the overlapping metal shear studs or connectors provided on the metal plates and projecting into the core cavity or with through studs welded at both ends onto the metal plates.

The invention claimed is:

1. An injection port for injecting a bonding agent into a composite structure, the composite structure comprising a core sandwiched between two metal plates, the injection port comprising a hollow stem for delivering the bonding agent through a hole in one of the metal plates into an interfacial space between the core and one of the two metal plates, the injection port further comprising a diffusion head connected to the hollow stem, the hollow stem and the diffusion head being in fluid communication for delivering the bonding agent into the interfacial space, wherein the diffusion head comprises a plurality of radially spaced outlets, and wherein the hollow stem comprises a plurality of channels at one end of the hollow stem, the channels being in fluid communication with the plurality of outlets on the diffusion head.

2. The injection port of claim 1, wherein the diffusion head includes a central hole for securing the hollow stem therein.

3. The injection port of claim 1, wherein when the hollow stem is disposed in a hole in a first of the two metal plates and the diffusion head is provided on a second of the two metal plates, the hollow stem is of sufficient length to define a desired width of the core between the two metal plates.

4. The injection port of claim 1, wherein the hollow stem is externally threaded for engaging a threaded hole in either one of the two metal plates or for engaging a bolt.

* * * * *